US009649553B2

United States Patent
Koyanagi et al.

(10) Patent No.: US 9,649,553 B2
(45) Date of Patent: May 16, 2017

(54) DIE ROLLING AND IDENTIFICATION APPARATUS AND GAMING MACHINE

(75) Inventors: Takashi Koyanagi, Omura (JP); Koichi Mori, Omura (JP)

(73) Assignee: SINOFAME GLOBAL LIMITED

( * ) Notice: Subject to any disclaimer, the term of this patent is extended or adjusted under 35 U.S.C. 154(b) by 0 days.

(21) Appl. No.: 14/236,559

(22) PCT Filed: Sep. 11, 2012

(86) PCT No.: PCT/JP2012/073227
§ 371 (c)(1),
(2), (4) Date: Jul. 23, 2015

(87) PCT Pub. No.: WO2014/041609
PCT Pub. Date: Mar. 20, 2014

(65) Prior Publication Data
US 2016/0001173 A1 Jan. 7, 2016

(51) Int. Cl.
*A63F 9/04* (2006.01)
*A63F 13/21* (2014.01)
*A63F 9/24* (2006.01)

(52) U.S. Cl.
CPC .......... *A63F 9/0468* (2013.01); *A63F 9/0406* (2013.01); *A63F 13/21* (2014.09); *A63F 2009/2482* (2013.01)

(58) Field of Classification Search
CPC .................. A63F 9/0468; A63F 9/0406; A63F 2009/0411; A63F 9/0402; G07C 15/001; G07C 15/003
See application file for complete search history.

(56) References Cited

U.S. PATENT DOCUMENTS 2,302,333 A  * 11/1942 Linke .................... A63F 9/0406
                                                  273/138.2
3,831,948 A  *  8/1974 Suda ..................... A63F 9/0406
                                                  273/145 R
(Continued)

*Primary Examiner* — Dmitry Suhol
*Assistant Examiner* — Ankit Doshi
(74) *Attorney, Agent, or Firm* — Jennifer Meredith, Esq.; Meredith & Keyhani, PLLC

(57) ABSTRACT

The present invention provides a gaming machine where players can play without giving them a sense of unfairness or suspicion and it is possible to identify die spots with a comparatively simple and uncomplicated structure. A gaming machine involving the present invention is characterized as a gaming machine comprising a die, a die container and a means of turning, the body of the die having transparency and the spot display panels formed on each face of the die having light shielding properties, the die container comprising a die shaker and a die slide where the die shaker is connected to the die slide in order to enable the die to move between the die shaker and the die slide, the die shaker has transparency, part of the die slide has light shielding properties, the die slide can slide without the die rolling, the means of turning turns the die container and comprises a motor and a plurality of gears connected to the motor. A means of reading comprising a light sensor is disposed on the bottom surface of the die slide, a means of illumination is disposed on the upper surface of the die slide, the die shaken in the die shaker is designed to stop in the prescribed position of the die slide that has light shielding properties, the means of illumination is disposed on the No. 1 face equating to the spots on the die stopped in the prescribed position and the means of reading is disposed on the No. 2 face opposite the No. 1 side, and the spots on the die are identified based on information obtained by the means of reading.

3 Claims, 7 Drawing Sheets

(56) References Cited

U.S. PATENT DOCUMENTS

| | | | | |
|---|---|---|---|---|
| 5,427,374 A | * | 6/1995 | Ulloa | G07C 15/003 |
| | | | | 273/144 B |
| 6,375,186 B1 | * | 4/2002 | Joo | G07C 15/001 |
| | | | | 273/138.1 |
| 2007/0029726 A1 | * | 2/2007 | Ohira | A63F 9/0402 |
| | | | | 273/145 R |
| 2010/0090398 A1 | * | 4/2010 | Tseng | A63F 9/0468 |
| | | | | 273/145 A |

\* cited by examiner (a) Light source

Light sensors (b) Positioning of light sensors in means of reading

DIE ROLLING AND IDENTIFICATION APPARATUS AND GAMING MACHINE

FIELD OF THE INVENTION

The present invention relates to a die rolling and identification apparatus and a gaming machine using said apparatus.

BACKGROUND ART

Conventionally, games played by rolling multiple dice and somehow identifying the resulting spots or a combination, etc., of spots on the dice to determine a win (or a loss), or games played to guess the spots or combination of spots on dice, are known.

For example, in patent document 1, fully automatic dice gaming machines, that aim to reduce the unfairness and effort when dice are rolled by human effort, are disclosed.

Furthermore, in recent years, it is known that in various gaming machines where the value on the dice, or combination of values, is guessed, animations and CG, instead of real dice, are used to create images.

In addition, in various gaming machines where real dice are used, there are more than a few structures that give players a sense of suspicion as to whether or not the spots are really random.

PRIOR ART DOCUMENTS

Patent Documents

Patent document 1: Government Publication No. 3127747—Utility model registration

SUMMARY OF THE INVENTION

Problems to be Solved by the Invention

As die rolling and identification apparatuses involving conventional technology (or gaming machines utilizing it) are comprised as described above, they have had the following problems.

For example, in gaming machines made to utilize real dice, including those shown in patent document 1, as they are made with a large space for identifying the spots on the dice, it is thought to be relatively easy to manipulate the state of the spots, including the way in which the die rolls, meaning that it is difficult to dispel the suspicions of players.

Furthermore, when animation or CG are used to create an image of die to express the spots on the die, etc., as it is even easier to manipulate the state of the spots than it is as compared with using an actual die, it is difficult to dispel the suspicions of players.

In other words, with conventional technology, with regard to the state of die rolling and spots, it is difficult to dispel the sense of unfairness and the suspicions of players, meaning that there has been a problem of players not being able to play in a relaxed state.

Furthermore, in gaming machines made to utilize real dice, as compact cameras, etc., were used to identify spots on the dice, there was a problem of the apparatus becoming cumbersome, which led to an increase in costs.

This invention was thus designed to solve the abovementioned problems and to provide a "die rolling and identification apparatus" where in addition to using an actual die, due to the nature of its structure it allows players to play without giving a sense of unfairness or suspicion, it makes possible the identification of spots on a die due to its relatively simple and basic structure.

Moreover, the present invention was designed to solve the problems of the abovementioned conventional technologies and to provide a "gaming machine" made using the die rolling and identification apparatus where in addition to using an actual die, due to the nature of its structure it allows players to play without giving a sense of unfairness or suspicion, it makes possible the identification of spots on a die due to its relatively simple and basic structure.

Means to Solve Problems

The die rolling and identification apparatus, which is the first embodiment of the present invention, was made to solve the abovementioned problems and is characterized as a die rolling and identification apparatus equipped with a die container containing a die and a means of turning that turns said die container; said die container comprising a die shaker and a die slide where said die shaker is connected to said die slide in order to enable said die to move between said die shaker and said die slide, said die shaker has transparency, part of said die slide has light shielding properties, said die slide can slide without said die rolling; said means of turning turns said die container and comprises a motor and a plurality of gears connected to said motor; said die shaken in said die shaker that is stopped in a prescribed position in said die slide where the light is blocked by controlling the turn stop angle using said means of turning. A means of reading the spots of said die stopped in said prescribed position is disposed on the side facing said die and said spots on said die are identified based on information obtained by such means for reading.

On account of this structure, because it is a die rolling and identification apparatus that can use an actual die, compared with conventional models that create images of dice using animation or CG, it is possible to obtain a die rolling and identification apparatus that dispels the suspicions of players and does not have a sense of unfairness. Through this type of structure, because it is equipped with said die shaker having transparency, for players it is possible to more clearly verify the shaking state of said die and obtain a die rolling and identification apparatus which dispels the suspicions of players and has no sense of unfairness. Furthermore, on account of this structure, said die shaker has transparency and as said die slide is made in such a way that said die slide can slide without rolling said die, players can see the state of said die during shaking and after shaking said die does not roll. Therefore, with this kind of structure, in addition to achieving an appropriate state of shaking for said die, it makes it possible to obtain a die rolling and identification apparatus that can eliminate improper die rolling after shaking (and after identification). Furthermore, with this kind of structure, by controlling the turning movement and stopping of said die container using said means of turning using said motor, etc., it is possible to carry out shaking of said die in a visible state and proper identification, etc., of spots on said die. That is to say, with this kind of structure, it is relatively simple to carry out shaking of said die. Therefore, it is difficult for erroneous electrical movement to occur and it is possible to obtain a die rolling and identification apparatus where it is difficult for improper operation to be carried out.

In a die rolling and identification apparatus structured in this way, it is desirable for there to be at least one internal elevated area to be disposed inside said die shaker.

The die rolling and identification apparatus involved in the present invention is able to shake said die inside said die shaker comprising of said die container by turning said die container using said means of turning. When doing so, as mentioned above, shaking of said die can be carried out more randomly if said internal elevated area (a raised area facing the inside of said die shaker) is disposed inside said die shaker.

Gaming machines involving the second aspect of the present invention are for solving the abovementioned problems and are characterized as gaming machines equipped with a die container containing said die and a means of turning that turns said die container; the body of said die having transparency and the spot display panels formed on each face of said die body which have light shielding properties; said die container comprising a die shaker and a die slide where said die shaker is connected to said die slide in order to enable said die to move between said die shaker and said die slide, said die shaker has transparency, part of said die slide which has light shielding properties, said die slide which can slide without said die rolling; said means of turning that turns said die container and comprises a motor and a plurality of gears connected to said motor; a means of reading comprising a light sensor that is disposed on the slide lower surface of said die slide, a means of illumination which is disposed on the slide upper surface of said die slide; said die shaken in said die shaker which is stopped in the prescribed position of said die slide having shielding properties by controlling the turn stop angle by said means of turning, said means of illumination which is disposed on the transparent part of said die slide stopped in a prescribed position, said means of illumination which is disposed on the No. 1 face equating to said spots on said die stopped in said prescribed position and said means of reading which is disposed on the No. 2 face opposite said No. 1 side, and said spots on said die identified based on information obtained by said means of reading.

On account of this structure, because it is a gaming machine using an actual die, compared with conventional models that create an image of dice using animation or CG, it is possible to obtain a gaming machine that dispels the suspicions of players and does not have a sense of unfairness. Through this type of structure, because it is equipped with said die shaker having transparency, for players it is possible to more clearly verify the shaking state of said die and it is possible to obtain a gaming machine which dispels the suspicions of players and has no sense of unfairness. Furthermore, on account of this structure, as said die shaker has transparency and said die slide is made so it can slide without rolling said die, players are able to see the state of shaking of said die and after shaking said die does not roll. Therefore, with this kind of structure, in addition to achieving an appropriate state of shaking for said die, it makes it possible to obtain a gaming machine that can eliminate improper die rolling after shaking (and after identification). Furthermore, with this kind of structure, as spots on said die are identified using said means of illumination and said light sensor, there is no use of conventional technology such as compact cameras and it is possible to obtain a gaming machine that has a comparatively simple structure and is low cost. Moreover, with this kind of structure, by controlling the turning movement and stopping of said die container using said means of turning using said motor, etc., it is possible to carry out shaking of said die in a visible state and proper identification, etc., of spots on said die. That is to say, with this kind of structure, it is relatively simple to carry out shaking of said die, etc. Therefore, it is difficult for erroneous electrical movement to occur and it is possible to obtain a gaming machine where it is difficult for improper operation to be carried out.

Advantageous Effect of the Invention

According to the present invention, in addition to using an actual die (a die that is not CG, etc.), on account of its structure, it is possible to obtain a "die rolling and identification apparatus" where players can play without giving them a sense of unfairness or suspicion and it is possible to identify die spots with a comparatively simple and uncomplicated structure. Furthermore, according to the present invention, in addition to using an actual die, on account of its structure, it is possible to obtain a "gaming machine" made using a die rolling and identification apparatus where players can play without giving them a sense of unfairness or suspicion and die spots can be identified with a comparatively a simple and uncomplicated structure.

DESCRIPTION OF EMBODIMENTS

The following explains embodiments of the present invention based on drawings.

This embodiment explains cases where the technology of the present invention is used to constitute a "large-small" gaming machine. "Large-small" refers to a Chinese game using three dice. However, the present invention is not limited to gaming machines and as long as it does not deviate from the purpose of the present invention, in addition to being able to be used as necessary in a variety of apparatuses, it is also possible to make various changes.

Figure 1:
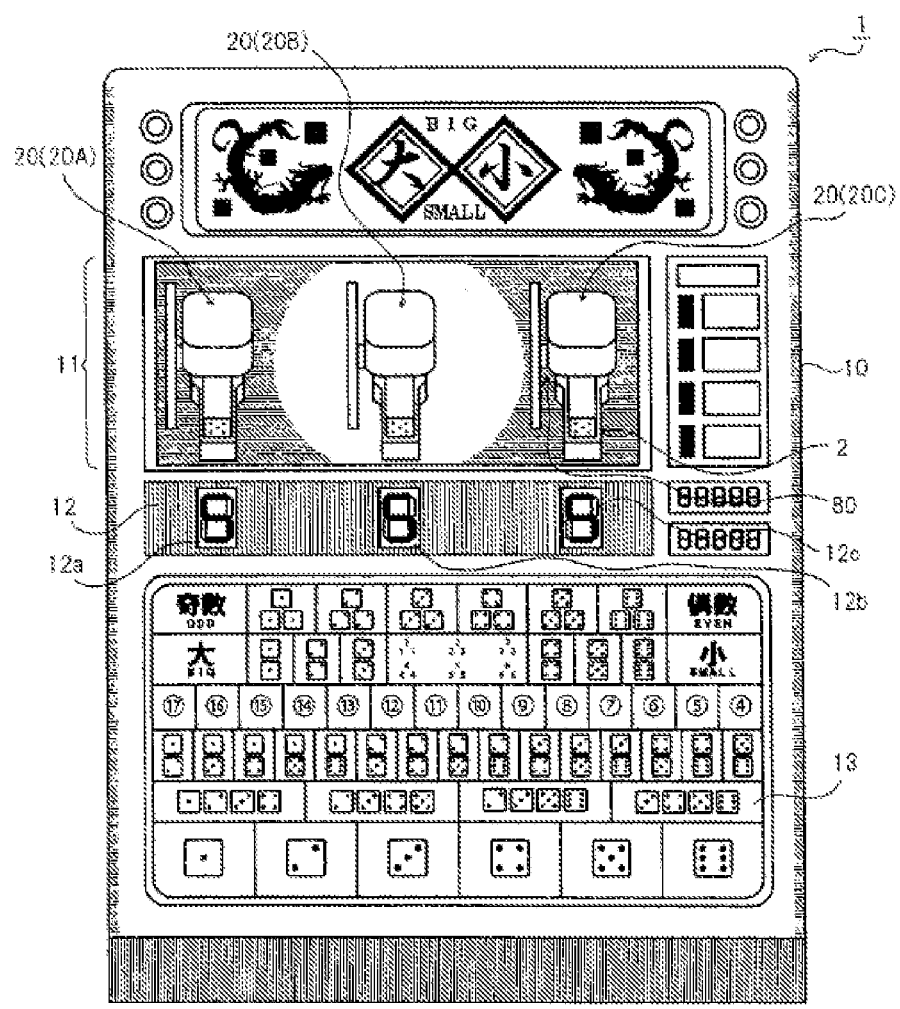
FIG. 1 is a simple front view of a gaming machine involving an embodiment of the present invention.
Figure 2:
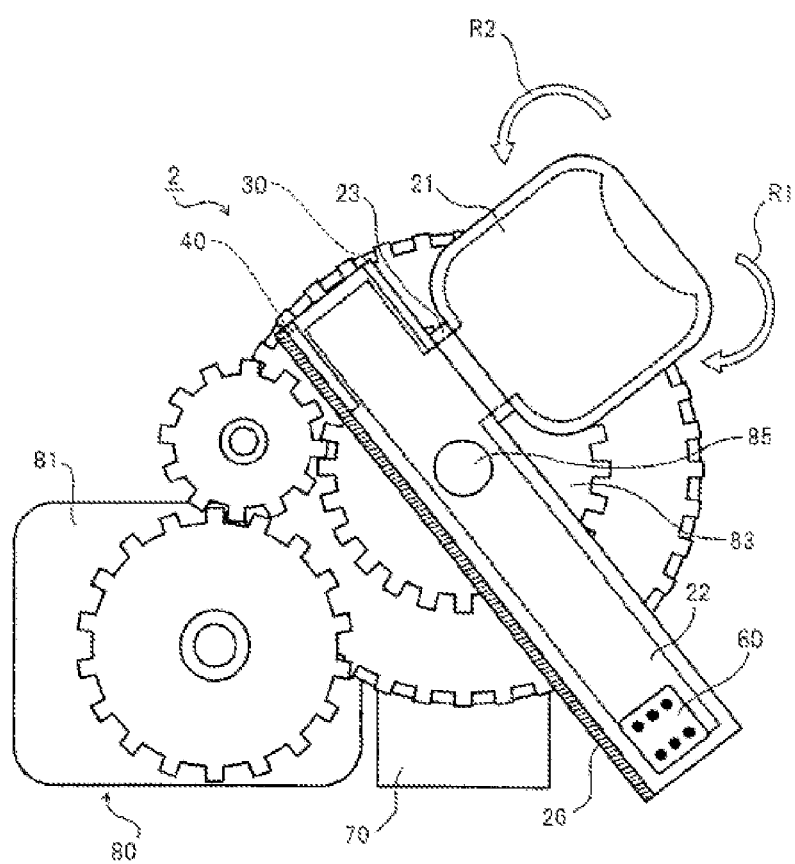
FIG. 2 is a simple side view of a die rolling and identification apparatus constituting a gaming machine involving an embodiment of the present invention and its peripheral elements.
Figure 3:
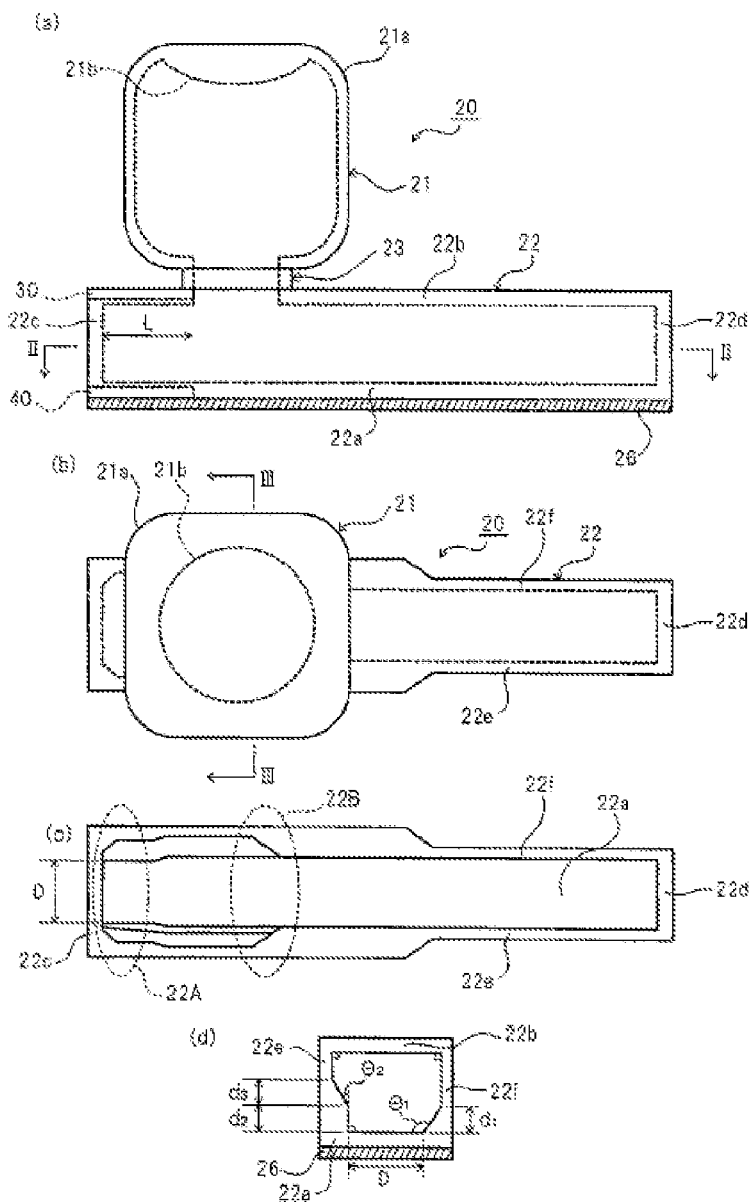
FIG. 3 is an outline drawing of a die rolling and identification apparatus constituting a gaming machine involving an embodiment of the present invention. (a) shows a simple side view, (b) shows a simple top view, (c) shows a line cross-sectional view in the direction of FIG. 3 (a) II-II, and (d) shows a line cross-sectional view in the direction of FIG. 3 (b) III-III (only the die slide).
Figure 4:
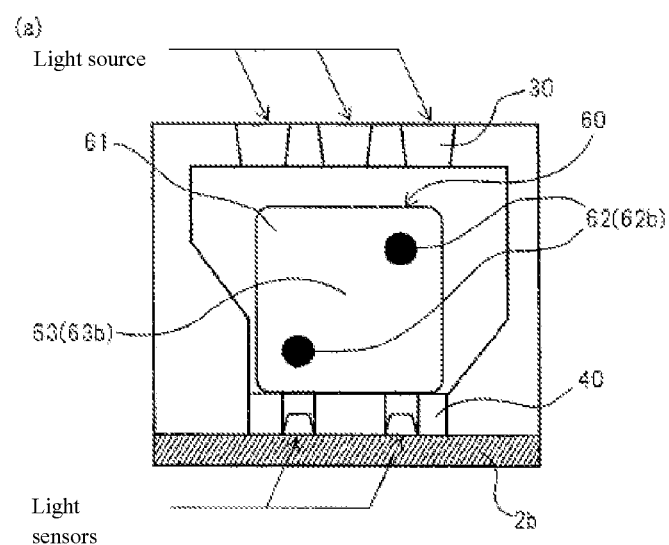
FIG. 4 is an outline drawing of a die rolling and identification apparatus constituting a gaming machine involving an embodiment of the invention. (a) shows a simple side view of the means of reading and (b) shows the position of the sensor (light sensor) of the means of reading.
Figure 4:
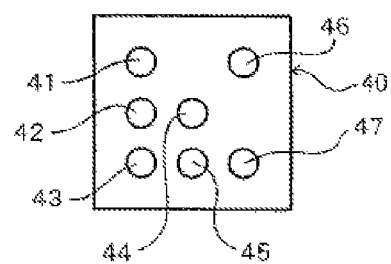
Figure 5:
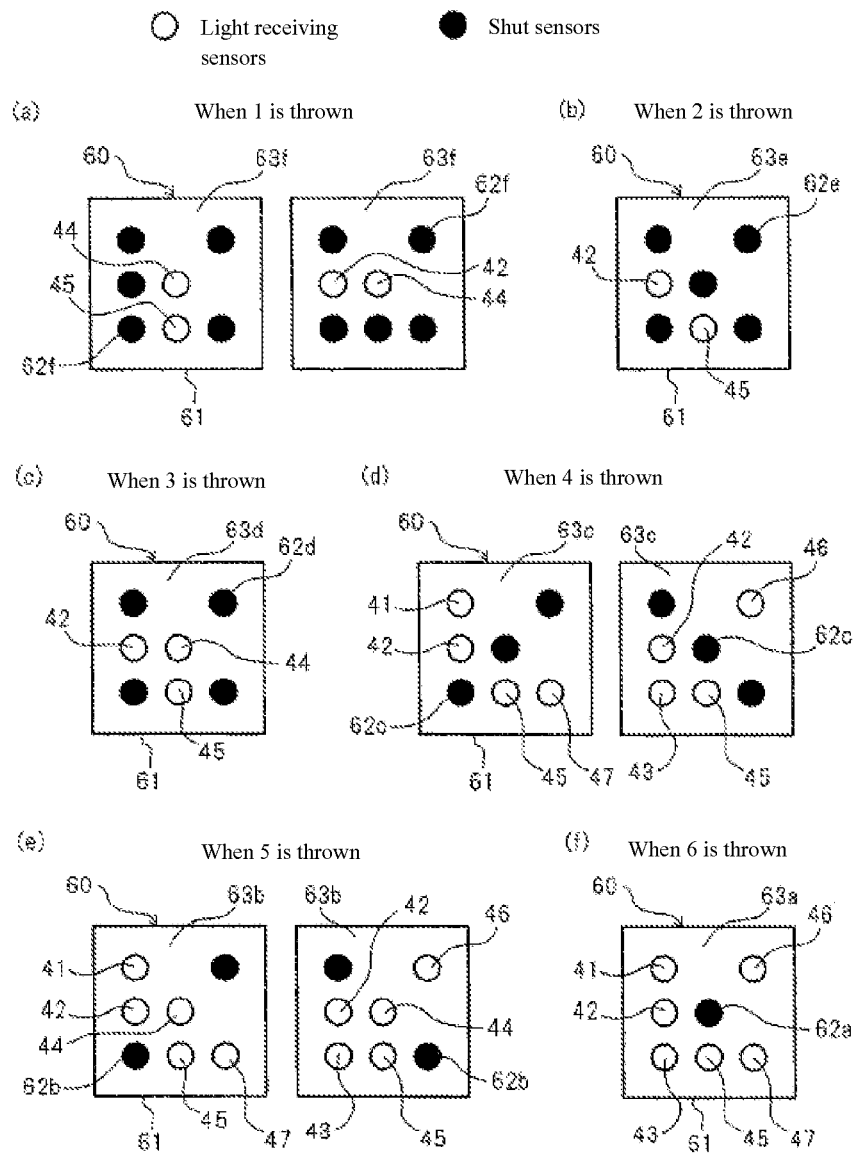
FIG. 5 is an outline drawing showing the light receiving state of each sensor of the means of reading the spots in the die rolling and identification apparatus constituting a gaming machine involving an embodiment of the invention. (a) shows the light receiving state of the sensor when "1" is rolled, (b) shows the light receiving state of the sensor when "2" is rolled, (c) shows the light receiving state of the sensor when "3" is rolled, (d) shows the light receiving state of the sensor when "4" is rolled, (e) shows the light receiving state of the sensor when "5" is rolled, and (f) shows the light receiving state of the sensor when "6" is rolled.

FIG. 1 shows a simple front view of a gaming machine involving an embodiment of the present invention. FIG. 2 shows a simple side view of a die rolling and identification apparatus and its peripheral elements. FIG. 3 shows an outline drawing of a die rolling and identification apparatus constituting a gaming machine involving an embodiment of the present invention; (a) shows a simple side view; (b) shows a simple top view; and (c) shows a line cross-sectional view in the direction of FIG. 3 (a) II-II; and (d) shows a line cross-sectional view in the direction of FIG. 3 (b) III-III (only the die slide). FIG. 4 shows an overview of the means of reading the spots on a die in a die rolling and identification apparatus constituting a gaming machine involving an embodiment of the present invention, (a) shows a simple side view of the means of reading and (b) shows a diagram of the position of the sensor (light sensor) of the means of reading. FIG. 5 is an outline drawing showing the light receiving state of each sensor of the means of reading the spots in the die rolling and identification apparatus constituting a gaming machine involving an embodiment of the present invention. (a) shows the light receiving state of the sensor when "1" is rolled, (b) shows the light receiving state of the sensor when "2" is rolled, (c) shows the light receiving state of the sensor when "3" is rolled, (d) shows the light receiving state of the sensor when "4" is rolled, (e) shows the light receiving state of the sensor when "5" is rolled, and (f) shows the light receiving state of the sensor when "6" is rolled.

As shown in FIG. 1, a gaming machine 1 involving these embodiments comprises a plurality of die rolling and identification apparatuses 2 disposed within a die rolling and identification apparatus enclosure 11 housed within a chassis 10. Three die rolling and identification apparatuses 2 are disposed within the gaming machine 1. Furthermore, in the lower part of the die rolling and identification apparatus enclosure 11, a liquid crystal display panel 12 corresponding to each of the die rolling and identification apparatuses 2 is disposed. In addition, a bet display panel 13 is disposed on the lower part of the liquid crystal display panel 12 for use when playing using the gaming machine 1 involving this embodiment.

Each of the die rolling and identification apparatuses 2 involved in this embodiment comprises a die container 20 and a means of turning 80, etc., as shown in FIG. 1 and FIG. 2, etc. A means of turning 80 corresponding to each of the die containers 20 (No. 1 die container 20A through No. 3 die container 20C) that turns and stops said die containers is disposed in this embodiment. A die 60 is contained within each of the die containers 20.

As shown in FIG. 2, etc., each die container 20 comprises a die shaker 21, a die slide 22 and an opening connector 23 connecting them. That is to say, the die container 20 involved in this embodiment comprises a die shaker 21 and a die slide 22 connected by an opening connector 23 that allows the die 60 contained to move between the die shaker 21 and the die slide 22. The die container 20 involved in this embodiment is made using material with transparency, for example, glass or plastic.

The die shaker 21 comprises a shaker 21a within which a die 60 can roll and be shaken, with an internal elevated area 21b disposed on the inside of the shaker 21a. Furthermore, the die slide 22 is structured in such as way that it is possible for it to slide without shaking the die 60 after being shaken in the die shaker 21.

The opening connector 23 connecting the die shaker 21 and the die slide 22 is made in such a way that the die 60 is able to move between the die shaker 21 and the die slide 22 without getting stuck. Specifically, the opening connector 23 is formed with a circular or rectangular opening and the diameter of the circular opening, or the length of one side of the rectangular opening, is made longer than the diagonal length of the die 60 ("a√3" when one side of the die 60 is "a").

The shaker body 21a of the die shaker 21 is structured in a way that the die 60 can be effectively shaken randomly. For example, the shaker body 21a is made to such a size that the corner portion located on the opposing corner of the die 60 (the distance "a√3" between a pair of corner portions) cannot at the same time touch the inside surface of the shaker body 21a in the internal space of the shaker body 21a.

As shown in FIG. 3, etc., the die slide 22 is comprised of the slide lower surface 22a, the slide upper surface 22b, the slide rear surface 22c, the slide front surface 22d, the slide left surface 22e, and the slide right surface 22f. That is to say, in addition to the die 60 being able to slide, the die slide 22 is made of a size that does not allow the die 60 to roll.

Furthermore, as shown in FIG. 3(a), in this embodiment, the distance between the slide rear surface 22c of the die slide 22 and the edges of the opening of the opening connector 23 near the slide rear surface 22c (rear surface die holding distance L) has more than a prescribed distance. The rear surface die holding distance L, for example, as mentioned later, when re-shaking the die 60, (for example when carrying out step S709 through S712, etc., please see FIG. 6 (c), etc.), is set at more than a prescribed distance in order to ensure than the die 60 does not drop into the die shaker 21 (to ensure it is not reinserted).

The rear surface holding distance L is set so that when the die 60 touches the slide rear surface 22c, the weight of the die 60 is positioned closer to the slide rear surface 22c than the edges of the opening of the opening connector 23 as it approaches the slide rear surface 22c. Specifically, the rear surface die holding distance L for a side of the die 60 "a" is set at, for example, "2a/3" or "a" (preferably more than "2a/3").

Moreover, in this embodiment, as shown in FIG. 3 (c), the No. 1 die guide 22A and No. 2 die guide 22B are disposed on the die slide 22. The No. 1 die guide 22A is made in such as way that the die 60 does not get stuck in the position where it is in contact with the slide rear surface 22c when it slides in the die slide 22. Specifically, No. 1 die guide 22A is made in such as way that it is at a wide angle from the slide rear surface 22c towards the slide front surface 22d. The No. 2 die guide 22B is made in such as way that the die 60 does not get stuck when moving from the slide rear surface 22c to the slide front surface 22d in the die slide 22 and can reach the slide front surface 22d without vibration, etc. Specifically, the No. 2 die guide 22B is made in such as way that it is at a smooth narrow angle from the slide rear surface 22c towards the slide front surface 22d.

Furthermore, at least one of the slide left surface 22e or the slide right surface 22f that form the die slide 22 is made in such a way that it has a prescribed sloping angle instead of simply being a vertical surface.

To be more specific, the internal space of the die slide 22 is made as shown in FIG. 3 (c). As shown in FIG. 3 (c), the internal dimensions of the slide lower surface 22a are made to be D (=the length of one side of the die 60). Furthermore, the height d1(=D/3) at an angle where the slide right surface 22f joins the slide lower surface 22a in facing upwards forming a vertical surface reaching to the slide upper surface 22b is θ1 (=91° to 150°, preferably 100° to 140°, and even more desirably 115° to 125°). In addition, the height d2 (=D/3) at an angle where the slide left surface 22e joins the slide lower surface 22a in facing upwards forming a vertical surface reaching to the slide upper surface 22b at a height of d3 (=D/3) is θ2 (=1° to 60°, preferably 10° to 50°, and even more desirably 25° to 35°).

Moreover, on the outside of the slide lower surface 22a of the die slide 22 is disposed a light shield 26. Here, some kind of light shielding material can be applied or cloth or board type material can be attached to the light shield 26. However, these embodiments are not limited to this configuration and the slide lower surface 22a itself can be made to have light shielding properties. Furthermore, for example, the slide lower surface 22a normally has transparency and can be made having transparency based on an electrical signal (for example a liquid crystal material, etc., can be disposed).

Furthermore, the internal elevated area 21b of the inside of the shaker body 21a is made convexly on the inside of the shaker body 21a. For example, the internal elevated area 21b is made with a spherical shape.

Furthermore, in this embodiment, as shown in FIG. 2 through FIG. 4, a means of reading 40 is disposed on the slide lower surface 22a close to the slide rear surface 22c of the die slide 22 and a means of illumination 30 is disposed on the slide upper surface 22b close to the slide rear surface 22c of the die slide 22 (in other words, in a position opposing the position in which the means of reading 40 is disposed).

The means of illumination 30 comprises a plurality of LED light-emitting elements. Furthermore, by using pulsed light emissions, the means of illumination 30 is made in such a way that it is not influenced by ambient light. Furthermore, the cycle of the pulsed light emissions can be randomly changed and the light sensor of the means of reading 40 reads in concert with the cycle of the pulsed light emissions. With this structure the influence of interfering light from the outside can be eliminated to a great extent.

As shown in FIG. 4, the means of reading 40 comprises a plurality of light sensors (light receiving elements). More specifically, as shown in FIG. 4, when identifying the spots on the die 60, seven light sensors are disposed in a position in contact with the surface opposing the surface displaying the spots (No. 1 light sensor 41 to No. 7 light sensor 47).

The die body 61 of the die 60 used in the gaming machine 1 involved in this embodiment is made having transparency (transparent or semitransparent). Specifically, it is made of glass or plastic, etc. The spot display panel 62 ("1" spot display panel 62a through "6" spot display panel 62𝑜 disposed on each of the faces of the die 60 (spot display surfaces 63) are made in such a way that paint, etc., is applied to the surfaces to achieve light shielding properties, or materials having light shielding properties are applied, etc. That is to say, each spot display surface 63 is made in such a way that areas other than the spot display panels 62 have transparency.

Here an explanation will be provided as to why the total number of spots positioned on opposing sides (in other words, two sides) is seven when a standard cuboid is used as die 60. In this case, the position of the light sensors 41 through 47 comprising the means of reading 40 are disposed in a position where the spot display panels 62 disposed on the die 60 can be appropriate assessed (see FIG. 4, etc.). More specifically, no matter in what direction the die 60 is placed above the means of reading 40, the spot displays 62 that need to be read are in a position where they can be read in a pattern in the light receiving and light blocking pattern of light sensors 41 through 47.

FIG. 5 is an outline drawing showing the light receiving state of each sensor of the means of reading the spots in the die rolling and identification apparatus constituting a gaming machine involving an embodiment of the present invention. The reading pattern of light sensors 41 through 47 is explained using FIG. 5. In FIG. 5, "○" indicates that the light sensor comprising the means of reading 40 is in a light receiving state, while "●" indicates that the light sensor comprising the means of reading 40 is not in a light receiving state.

In this embodiment, the vicinity of the slide rear surface 22c of the die slide 22 is the die 60 spot reading position and during play the die 60 is stopped in this position between the means of illumination 30 and the means of reading 40. Here, the light emitted from the means of illumination 30 is transmitted through the die body 61 and die spot identification is carried out based on the pattern of the transmitted light received by the light sensors and the light shielded (light is not received) from the light sensors on the spot displays 62.

FIG. 5 (a) shows the light receiving state of the sensor of the means of reading 40 when "1" is rolled. The left and right diagrams of FIG. 5 (a) respectively show the state where spot display panel 62f disposed on spot display surface 63f is shielding a number of light sensors when "6" spot display surface 63f is in contact with the means of reading 40. The left and right diagrams of FIG. 5 (a) show cases where the angle at which the die is stopped is 90° different. For the left diagram in FIG. 5 (a), the spots on the side facing spot display surface 63f are identified as "1" by No. 4 light sensor 44 and No. 5 light sensor 45 receiving light. Likewise, in the case of the right diagram in FIG. 5 (a), the spots on the side facing spot display surface 63f are identified as "1" by No. 2 light sensor 42 and No. 4 light sensor 44 receiving light. That is to say, if the light sensors comprising the means of reading 40 involved in this embodiment are in this position, with respect to "6" spot display surface 63f, as one or other of the diagrams shown in FIG. 5 (a) will be the light receiving pattern, the spots can be accurately identified as "1".

FIG. 5 (b) shows the light receiving state of the sensor of the means of reading 40 when "2" is rolled. FIG. 5 (b) shows the state where spot display panel 62e disposed on spot display surface 63e is shielding a number of light sensors when "5" spot display surface 63e is in contact with the means of reading 40. No matter at what angle "5" spot display surface 63e is stopped, it will be as shown in FIG. 5 (b). In this embodiment, as shown in FIG. 5 (b), the light receiving patterns formed by the No. 2 light sensor 42 and No. 5 light sensor 45 show that the spots on the side facing spot display surface 63e are shown as "2". That is to say, if the light sensors comprising the means of reading 40 involved in this embodiment are in this position, with respect to "5" spot display surface 63e, as the diagram shown in FIG. 5(b) will always be the light receiving pattern, the spots can be accurately identified as "2".

FIG. 5 (c) shows the light receiving state of the sensor of the means of reading 40 when "3" is rolled. FIG. 5 (c) shows the state where spot display panel 62d disposed on spot display surface 63d is shielding a number of light sensors when "4" spot display surface 63d is in contact with the means of reading 40. No matter at what angle "4" spot display surface 63d is stopped, it will be as shown in FIG. 5 (c). In this embodiment, as shown in FIG. 5 (c), the light receiving patterns formed by the No. 2 light sensor 42, No. 4 light sensor 44 and No. 5 light sensor 45 show that the spots on the side facing spot display surface 63d are shown as "3". That is to say, if the light sensors comprising the means of reading 40 involved in this embodiment are in this position, with respect to "4" spot display surface 63*d*, as the diagram shown in FIG. 5 (*c*) will always be the light receiving pattern, the spots can be accurately identified as "3".

FIG. 5 (*d*) shows the light receiving state of the sensor of the means of reading 40 when "4" is rolled. The left and right diagrams of FIG. 5 (*d*) respectively show the state where spot display panel 62*c* disposed on spot display surface 63*c* is shielding a number of light sensors when "3" spot display surface 63*c* is in contact with the means of reading 40. The left and right diagrams of FIG. 5 (*d*) respectively show cases where the angle at which the die is stopped is 90° different. For the left diagram in FIG. 5 (*d*), the spots on the side facing spot display surface 63*c* are identified as "4" by No. 1 light sensor 41, No. 2 light sensor 42, No. 5 light sensor 45 and No. 7 light sensor 47 receiving light. Likewise, in the case of the right diagram in FIG. 5 (*d*), the spots on the side facing spot display surface 63*c* are identified as "4" by No. 2 light sensor 42, No. 3 light sensor 43, No. 5 light sensor 45 and No. 6 light sensor 46 receiving light. That is to say, if the light sensors comprising the means of reading 40 involved in this embodiment are in this position, with respect to "3" spot display surface 63*c*, as one or other of the diagrams shown in FIG. 5 (*d*) will be the light receiving pattern, the spots can be accurately identified as "4".

FIG. 5 (*e*) shows the light receiving state of the sensor of the means of reading 40 when "5" is rolled. The left and right diagrams of FIG. 5 (*e*) respectively show the state where spot display panel 62*b* disposed on spot display surface 63*b* is shielding a number of light sensors when "2" spot display surface 63*b* is in contact with the means of reading 40. The left and right diagrams of FIG. 5 (*e*) respectively show cases where the angle at which the die is stopped is 90° different. For the left diagram in FIG. 5 (*e*), the spots on the side facing spot display surface 63*b* are identified as "5" by No. 1 light sensor 41, No. 2 light sensor 42, No. 4 light sensor 44, No. 5 light sensor 45 and No. 7 light sensor 47 receiving light. Likewise, in the case of the right diagram in FIG. 5 (*e*), the spots on the side facing spot display surface 63*b* are identified as "5" by No. 2 light sensor 42, No. 3 light sensor 43, No. 4 light sensor 44, No. 5 light sensor 45 and No. 6 light sensor 46 receiving light. That is to say, if the light sensors comprising the means of reading 40 involved in this embodiment are in this position, with respect to "2" spot display surface 63*b*, as one or other of the diagrams shown in FIG. 5 (*e*) will be the light receiving pattern, the spots can be accurately identified as "5".

FIG. 5 (*f*) shows the light receiving state of the sensor of the means of reading 40 when "6" is rolled. FIG. 5 (*f*) shows the state where spot display panel 62*a* disposed on spot display surface 63*a* is shielding a number of light sensors in the centre when "1" spot display surface 63*a* is in contact of the means of reading 40. No matter at what angle "1" spot display surface 63*a* is stopped, it will be as shown in FIG. 5 (*f*). In this embodiment, as shown in FIG. 5 (*f*), the light receiving patterns formed by No. 1 light sensor 41, No. 2 light sensor 42, No. 3 light sensor 43, No. 5 light sensor 45, No. 6 light sensor 46 and No. 7 light sensor 47 show that the spots on the side facing spot display surface 63*a* are shown as "6". That is to say, if the light sensors comprising the means of reading 40 involved in this embodiment are in this position, with respect to "1" spot display surface 63*a*, as the diagram shown in FIG. 5 (*f*) will always be the light receiving pattern, the spots can be accurately identified as "6".

The means of turning 80 in the die rolling and identification apparatus 2 involved in this embodiment comprises an electric motor 81 (equating to "motor" in the present invention) and a plurality of gears connected to the electric motor 81 that turn and stop the abovementioned die container 20. The prescribed gear 83 and die container 20 being connected to a rotating central shaft 85, where driving force from the electric motor 81 is transmitted to the die container 20 through the plurality of gears and the rotating central shaft 85.

A block read sensor 70 is disposed in an appropriate position in the vicinity of the gears comprising the means of turning 80. The block read sensor 70 comprises, for example, a light emitting part and light sensors, etc., disposed in the vicinity of the gears. Specifically, reflective areas, illuminated areas and open areas, etc., are disposed on the gears and light signals from the reflected light and permeating light, etc., are received by the light sensor, etc., of the block read sensor 70. Through this block read sensor so structured, the present state (revolution position, block, etc.) of the means of turning 80 can be appropriately recognized according to the block read sensor 70. The block read sensor 70 can also be attached directly to gears, is not limited to the abovementioned configuration and can be comprised in various ways as required.

An electric motor 81 involved in this embodiment drives and stops based on control commands from a CPU (shown in summarized form in the diagram) and signals received from the block read sensor 70. In other words, in this embodiment, by means of the drive, etc., of the electric motor 81, the die container 20 can be turned in a clockwise direction R1 or an anticlockwise direction R2 and the die container 20 can be stopped in an appropriate position (spot reading position, spot display position, etc.).

In this embodiment, three liquid crystal display panels 12 (No. 1 display panel 12*a* through No. 3 display panel 12*c*) are disposed on each die rolling and identification apparatus 2. Here, the liquid crystal display panels 12 are comprised, for example, of seven standard segments.

Before play on a gaming machine 1, for example, these liquid crystal display panels 12 are either not illuminated, illuminated randomly or illuminated to show the values from the previous game. When play begins on a gaming machine 1, when the die rolling and identification apparatus 2 is being alternately and repeatedly rotated in a clockwise direction R1 and an anticlockwise direction R2 (when the die 60 is being shaken), for example, the liquid crystal display panels 12 flash or are randomly illuminated. At the time when the dice 60 are being identified in the die rolling and identification apparatuses 2 (when the spots are being read), for example, the liquid crystal display panels 12 are not illuminated, and when the spots on the dice 60 are revealed to the player the liquid crystal display panels are illuminated and the value of the spots is shown on each of the liquid crystal display panels 12.

In this embodiment, as shown in FIG. 1, bet display panels 13 are disposed beneath the liquid crystal display panels 12. These bet display panels 13 are a configuration example of a gaming machine 1 and the shape, size and combination, etc., of the bet display panels can vary greatly as required.

The gaming machine 1 involved in this embodiment is comprised as described above and functions as shown below.

Figure 6:
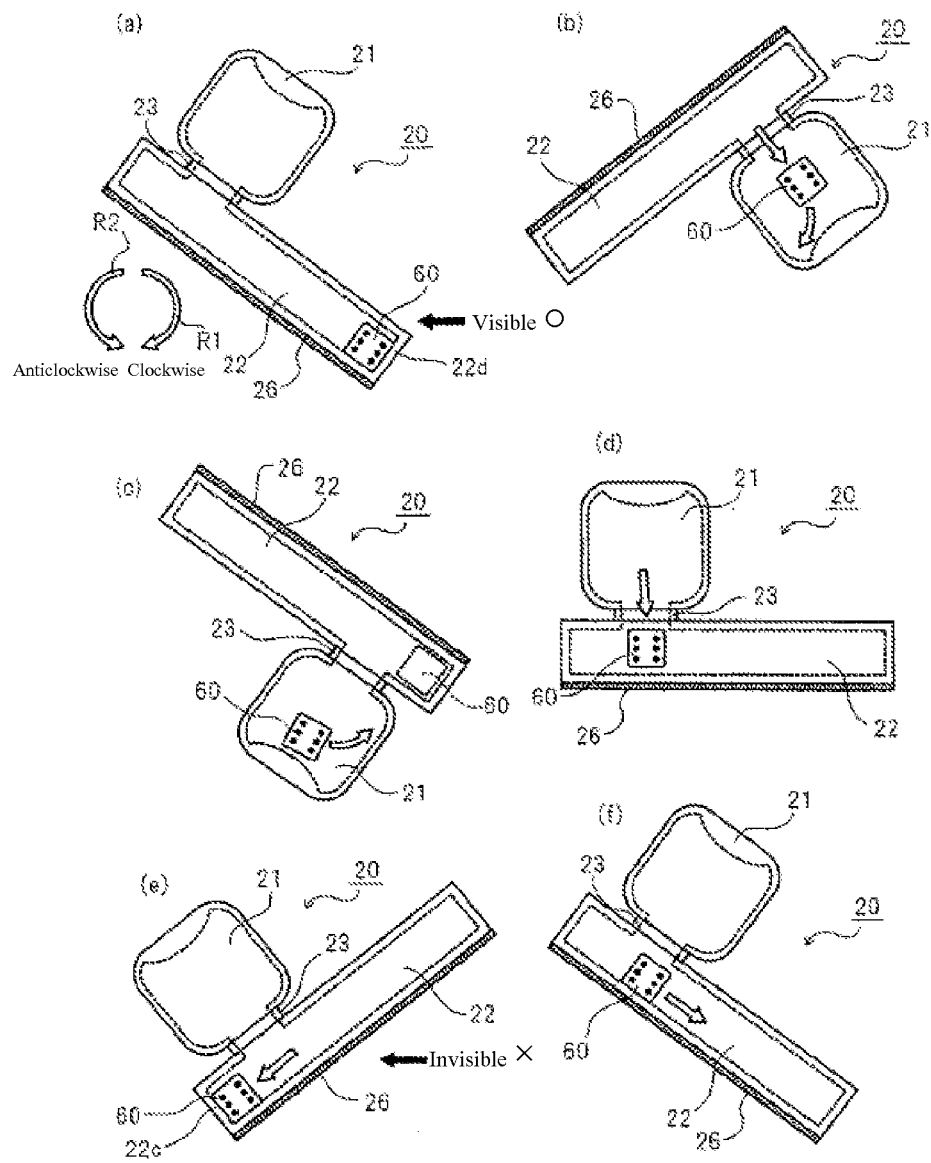
FIG. 6 is an outline drawing to explain the die rolling and identification apparatus constituting a gaming machine involving an embodiment of the present invention.
Figure 7:
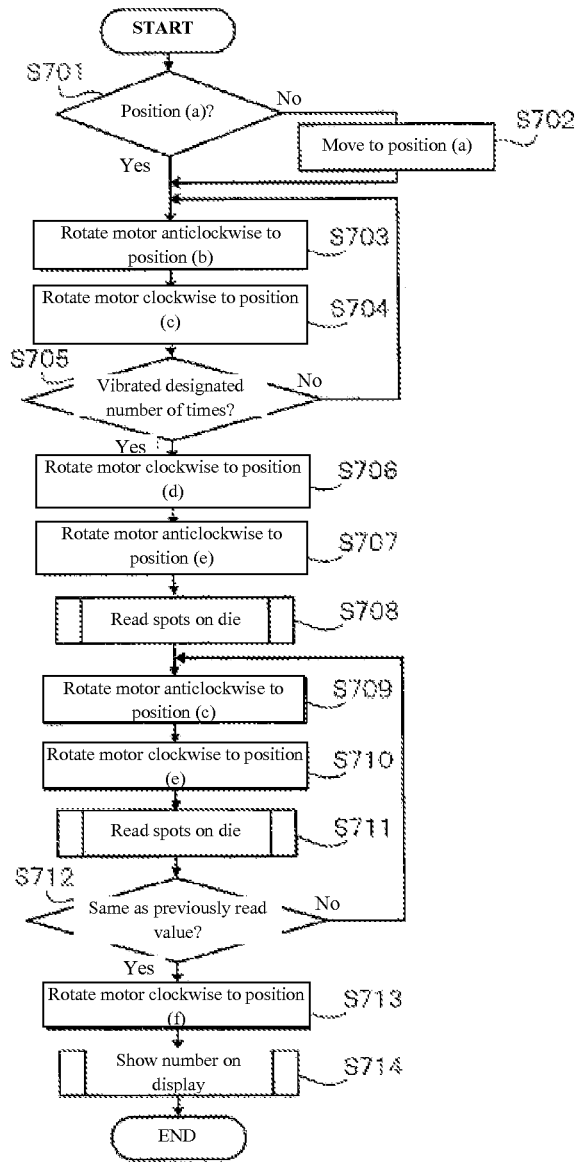
FIG. 7 is a flowchart showing the process that occurs when playing a gaming machine involving an embodiment of the present invention.

Here, FIG. 6 shows a simple side view explaining the operational state of the die rolling and identification apparatuses comprising the gaming machine involved in this embodiment of the present invention. FIG. 7 shows part of a flowchart for when the gaming machine involved in this embodiment of the present invention is being played.

In the following, in addition to FIG. 1 through FIG. 5, the function (including the function effect) of the gaming machine 1 involved in this embodiment will be explained using the abovementioned FIG. 6 and FIG. 7.

FIG. 6 (a) is the position at the time of the commencement of operation (or the finish of operation) of the gaming machine 1 shown in FIG. 1 (hereinafter referred to as the "die container standard position). When the die container 20 and the die 60 within the die container 20 are in this die container standard position, the die 60 is stopped in a position touching the slide front surface 22d of the die slide 22 and the spots on the die 60 are in a state to be able to seen by the player.

When the game is being carried out using the gaming machine 1 involved in this embodiment (when play is able to begin), as shown in FIG. 7, firstly, a check is carried out (step S701) to ascertain whether the die container 20 is in the FIG. 6 (a) die container standard position.

When the die container 20 is not in the FIG. 6 (a) die container standard position ("No" in S701), based on a signal from the CPU, the electric motor 81 is activated and the die container 20 is moved to the die container standard position (the FIG. 6 (a) position) (step S702).

When the die container 20 is in the FIG. 6 (a) die container standard position ("Yes" in S701), based on a signal from the CPU the electric motor 81 is activated and the die container 20 is rotated in a anticlockwise direction R2 to the FIG. 6 (b) position (hereinafter referred to as the "shaker insertion position") (step S703). If the die container 20 is rotated in this way, the die 60 inside the die shaker 21 will be inserted into the die slide 22 through the opening connector 23.

After that, based on a signal from the CPU, the electric motor 81 is activated and the die container 20 is rotated in a clockwise direction R1 from the shaker insertion position to the FIG. 6 (c) position (hereinafter referred to as the "die shaker position") (step S704).

After that, based on a signal from the CPU and by activating the electric motor 81, a check is carried out to ascertain whether the die container 20 has been vibrated the designated number of times (step S705). That is to say, to check whether or not the die 60 in the die container 20 has been shaken.

If the die container 20 has not been shaken the designated number of times ("No" in S705), steps S703 and S704 are once again carried out. That is to say, based on a signal from the CPU, the electric motor 81 is activated, the die container 20 is vibrated in an anticlockwise direction R2 and in a clockwise direction R1 and the die 60 inside the die container 20 is shaken.

When the die container 20 is being vibrated a designated number of times ("Yes" in S705), or in other words, when the die 60 inside die container 20 is being shaken appropriately, at the same time step S706 is being carried out.

After shaking of the die 60 in the die container 20 has been appropriately carried out, based on a signal from the CPU the electric motor 81 is activated and the die container 20 is rotated in a clockwise direction R1 to the FIG. 6 (d) position (hereinafter referred to as the "slide insertion position") (step S706). By rotating the die container 20 in this way the die 60 is inserted into the slide 22 through the opening connector 23 from the die shaker 21.

After that, based on a signal from the CPU, the electric motor 81 is activated, the die container 20 is rotated in an anticlockwise direction R2 from the slide insertion position to the FIG. 6 (e) position (hereinafter referred to as the "spot reading position").

The gaming machine 1 involved in this embodiment is made in such a way as to prevent the player from seeing the die 60 in the spot reading position. Specifically, as explained using FIG. 3, etc., a light shield 26 is disposed on the slide lower surface 22a of the slide 22. In the spot reading position, the spots on the die 60 are read using the means of illumination 30 disposed on the slide upper surface 22b in the vicinity of the slide rear surface 22c and the means of reading 40 disposed on the slide lower surface 22a in the vicinity of the slide rear surface 22c (step S708).

After the reading of the spots on the die 60 has been carried out (S708), after that, based on a signal from the CPU, the electric motor 81 is activated and the die container 20 is rotated in an anticlockwise direction R2 (step S709) until it is in the FIG. 6 (c) position. When doing so, as the die container 20 moves from the FIG. 6 (e) state to the FIG. 6 (c) state (or as already mentioned the rear surface die holding distance L is being established), the position of the die 60 inside the die slide 22 that is revealed in the area of the dotted line in FIG. 6 (c) is maintained without it being reinserted into the die shaker 21.

After that, based on a signal from the CPU, the electric motor 81 is activated and the die container 20 is rotated in a clockwise direction R1 (step S710) from the FIG. 6 (c) position until it is in the FIG. 6 (e) spot reading position.

After that, in the same way as with step S708, reading of the spots on the die 60 (step S711) is carried out by the means of illumination 30 disposed on the slide upper surface 22b in the vicinity of the slide rear surface 22c and the means of reading 40 disposed on the slide lower surface 22a in the vicinity of the slide rear surface 22c (step S711).

After that, in step S712, a check is carried out to ascertain whether or not the value read in step S711 and the value read previously are the same.

If the value read in step S711 and the value read previously are not the same ("No" in S712), then the process from step S709 (re-shaking) is carried out once again.

If the value read in step S711 and the value read previously are the same ("Yes" in S712), then the value of the spots read is confirmed and the process from step S713 is carried out.

After that, in step S713, based on a signal from the CPU, the electric motor 81 is activated and the die container 20 is rotated in a clockwise direction R1 from the FIG. 6 (e) position to the FIG. 6 (f) position. When the die container 20 is rotated to the FIG. 6 (f) position, the die 60 inside the die slide 22 slides inside the die slide 22 without rolling and stops in a position touching the slide front surface 22d as shown in FIG. 6 (a). When the die 60 is located in this position, the spots on the die 60 are able to be seen.

After that, in this embodiment, the values of the spots on the die 60 within each of the dice containers 20 are displayed on the liquid crystal display panels 12 (No. 1 display panel 12a through No. 3 display panel 12c).

In this embodiment, when all of the light sensors 41 through 47 in the means of reading 40 are in a light receiving state, then it is determined that the die 60 is no longer in the appropriate reading position and the process from step S709 is once more carried out.

The gaming machine 1 in this embodiment is activated as shown previously in FIG. 6 and FIG. 7.

That is to say, when the die containers 20 comprising the gaming machine 1 involved in this embodiment start to move from the die container standard position (FIG. 6 (*a*)) and rotate and move to the shaker insertion position (FIG. 6 (*b*)), the die 60 is inserted into the shaker 21 through the opening connector 23 from the die slide 22.

As the die shaker 21 comprising the die container 20 has transparency, players can visually confirm the state of shaking of the die 60 inside the die shakers 21. Furthermore, inside the die shaker 21, as the internal elevated area 22*b* is stepped as it faces the inside, the shaking of the die 60 can be carried out effectively.

After rotating the electric motor 81 which comprises the means of turning 80 a multiple number of times (in a clockwise direction R1 and an anticlockwise direction R2) and rotating and vibrating the die container 20 an appropriate number of times (after having shaken the die 60), if the die containers 20 is rotated and moved to the slide insertion position (FIG. 6 (*d*)), the die 60 is inserted into the die slide 22 through the opening connector 23 from the die shaker 21. After that, by rotating the electric motor 81, the die 60 is slid and moved inside the die slide 22 to the spot reading position.

After the die 60 has moved to the die slide 22, due to the construction of the die slide 22 as shown in FIG. 3, the die 60 is not able to roll, etc., and is strongly resistant to outside impacts, etc., meaning that the value of the spots on the die 60 can be easily established.

Furthermore, in this embodiment, the reading of the die 60 is carried out, the read data (spot value) is kept while [the die 60] is moved to the vibration repeating position (the position of the die 60 shown by the dotted line in FIG. 6 (*c*)) and fine vibrations are applied to the die 60 by rotating it in a short cycle in a clockwise direction R1 and an anticlockwise direction R2. This process is carried out in order to eliminate erroneous reading of the spots.

For example, if any irregularity occurs to the die 60 or the die container 20 and the die 60 is not able to be positioned in the normal reading position (spot reading position), by applying fine vibrations as mentioned above it can correct its position. In addition, after the correction of the position has been carried out, the die 60 is once again rotated and moved into the spot reading position and spot reading is once again carried out.

Furthermore, in this embodiment, when the previous reading result (data) does not match the present reading result (data), the die container 20 is rotated once again to the vibration repeating position and after applying fine vibrations the position of the die 60 is adjusted and spot reading is carried out. When the previous data matches that of the present data the die 60 spot data is confirmed and the die container 20 is rotated to the die container standard position. By rotating the die container 20 the die 60 is moved to the die display position (the position where the die 60 is touching the slide front surface 22*d* of the die slide 22) and is revealed to the player. At the same time, the confirmed spot value of the die 60 revealed to the player is displayed on the liquid crystal display panel 12 and one play is completed.

As the gaming machine 1 involved in this embodiment comprises the functions mentioned above, it can obtain the following function and effects.

The gaming machine 1 involved in this embodiment is a gaming machine 1 with a die 60, a die container 20 containing a die 60, and a means of turning 80 that rotates the die container 20, the die body 61 has transparency and the spot displays panels 62 on each side of the die body 61 (spot display surfaces 63) have light shielding properties, the die container 20 has a die shaker 21 and a die slide 22, the die shaker 21 and the die slide 22 are connected to enable the die 60 to move between the die shaker 21 and the die slide 22, the die shaker 22 has transparency, part of the die slide 22 has light shielding properties (the slide lower surface 22*a* in this embodiment), the die slide 22 is made in such a way that it can slide without rolling the die 60, the means of rolling 80 that rotates the die container 20 comprises an electric motor 81 and a plurality of gears connected to the electric motor 81, a means of reading 40 using light sensors 41 through 47 is disposed on the slide lower surface 22*a* of the die slide 22, a means of illumination 30 is disposed on the slide upper surface 22*b* of the die slide 22, by controlling the rotation stop angle using the means of turning 80, a die 60 is shaken in the die shaker 21 and can be stopped in a prescribed position where the die slide 22 has light shielding properties, a means of illumination 30 is disposed on the No. 1 side (on the spot display side revealed to the player) corresponding to the spots on the die 60 stopped in the prescribed position, a means of reading 40 is disposed on the No. 2 side opposite the No. 1 side (on the spot display side in a position opposite to the spot display side that is revealed to the player) and based on the information obtained from the means of reading 40, the spots of the die 60 are recognized.

With this kind of structure, because it is a gaming machine 1 using real dice, compared with conventional gaming machines that create images of dice using animation or CG, it is possible to obtain a gaming machine 1 that dispels the suspicions of players and does not have a sense of unfairness.

Furthermore, with this kind of structure, because it is equipped with die shakers 21 having transparency, it is easier for players to verify the shaking state of the dice 60 and obtain a gaming machine 1 which dispels the suspicions of players and has no sense of unfairness.

Furthermore, with this kind of structure, the die shaker 21 has transparency and as the die slide 22 can move only when the die 60 is not rolling, players can see the state of the die 60 during shaking and after shaking the die 60 does not roll. Therefore, with this kind of structure, in addition to achieving an appropriate state of shaking for the die 60, it makes it possible to obtain a gaming machine 1 that can eliminate improper die rolling after shaking (and after identification).

Furthermore, with this kind of structure, because the spots on the die 60 are identified using the means of illumination 30 and light sensors 41 through 47, it is possible to obtain a gaming machine 1 with a comparatively simple construction that is low cost.

Furthermore, with this kind of structure, by controlling the turning movement and stopping of the die container 20 applying the means of turning 80 using the electric motor 81, etc., it can carry out shaking of the die 60 in a visible state that allows proper identification, etc., of spots on the die 60. That is to say, with this kind of structure, it is relatively simple to carry out shaking of the die 60. Therefore, it is difficult for erroneous electrical movement to occur and it is possible to obtain a gaming machine 1 where it is difficult for improper operation to be carried out.

As explained above, according to the invention involved in this embodiment, in addition to using real dice, on account of its structure, it is possible to obtain a gaming machine 1 comprising die rolling and identification apparatuses 2 where players can play without giving them a sense of unfairness or suspicion and it can identify die spots comparatively easily and using a simple structure.

Other Embodiments

The present invention is not limited to the abovementioned embodiments, and various variations and modifications may be made without departing from the scope of the present invention.

In the abovementioned embodiments, the case of a die container comprising a connected die shaker and a die slide was explained. However, this invention is not limited to such as structure. Therefore, the die container involved in the present invention may also have a structure with an integrated die shaker and die slide.

Furthermore, in the abovementioned embodiment, although a structure with a light shield 26 disposed only on the slide lower surface 22a of the die slide 22 was described, the present invention is not limited to that structure. Therefore, for example, in addition to the slide lower surface 22a, the structure may have a light shield 26 disposed also on the slide front surface 22d, the slide left surface 22e, or the slide right surface 22f. With this kind of structure it can properly eliminate improper viewing, etc., of the dice 60.

Furthermore, in the abovementioned embodiment, as shown in step S705 of FIG. 7, based on a signal from the CPU and through the activation of the electric motor 81, a "check to judge whether or not the die container 20 has been vibrated the prescribed number of times" is carried out. That is to say, although it has been explained that after a check has been carried out with regard to whether or not the die 60 has been shaken the prescribed number of times in the die container 20 and that based on that judgement the process from step S706 is then carried out and the spots on the die 60 are read, the present invention is not limited to that structure. Therefore, for example, other structures may include a stop button disposed to stop the rotating die container 20 at the player's designated time (or at a time during a prescribed time period). With this kind of structure, for example, in step S705 in FIG. 7, a structure would be desirable whereby a check would be carried out to ascertain whether or not the stop button had been pressed and based on that judgement the process from step S706 would be carried out and the spots on the die 60 would be read. With this kind of structure, the die container 20 can be stopped at a desired time by the player. Furthermore, for example, another structure could be where the abovementioned stop button is disposed and in step S705 of FIG. 7 a structure would be desirable whereby a check is carried out to ascertain whether the "die container 20 has been vibrated the prescribed number of times or whether the stop button has been pressed" and based on that judgement the process from step S706 would be carried out and the spots on the die 60 would be read. With this kind of structure, the time for the die container 20 to be vibrated a prescribed number of times would be the prescribed time during which the stop button could be pressed and the die container 20 stop timing can be selected according to the desire of the player.

INDUSTRIAL APPLICABILITY

A die rolling and identification apparatus involving the present invention can be applied to various apparatuses requiring die spots. Furthermore, as gaming machines involving the present invention are comprised of the abovementioned die rolling and identification apparatus, players can play without giving them a sense of unfairness or suspicion and it is possible to identify die spots comparatively easily and using a simple structure.

EXPLANATION OF SYMBOLS

1 Gaming machine
2 Die rolling and identification apparatus
10 Chassis
11 Die rolling and identification apparatus enclosure
12 Liquid crystal display panel
12a No. 1 display panel
12b No. 2 display panel
12c No. 3 display panel
13 Bet display panel
20 Die container
20A No. 1 die container
20B No. 2 die container
20C No. 3 die container
21 Die shaker
21a Shaker body
21b Internal elevated area
22 Die slide
22a Slide lower surface
22b Slide upper surface
22c Slide rear surface
22d Slide front surface
22e Slide left surface
22f Slide right surface
22A No. 1 die guide
22B No. 2 die guide
23 Opening connector
26 Light shield
30 Means of illumination
40 Means of reading (light sensor)
41 No. 1 light sensor
42 No. 2 light sensor
43 No. 3 light sensor
44 No. 4 light sensor
45 No. 5 light sensor
46 No. 6 light sensor
47 No. 7 light sensor
60 Die
61 Die body
62 Spot display panels
62a "1" spot display panel
62b "2" spot display panel
62c "3" spot display panel
62d "4" spot display panel
62e "5" spot display panel
62f "6" spot display panel
63 Spot display surfaces
63a "1" spot display surface
63b "2" spot display surface
63c "3" spot display surface
63d "4" spot display surface
63e "5" spot display surface
63f "6" spot display surface
70 Block read sensor
80 Means of turning
81 Electric motor

What is claimed is:
1. A die rolling and identification apparatus characterized by comprising
a die container containing a die and a means of turning that turns said die container,
said die container comprising a die shaker and a die slide where said die shaker is connected to said die slide by an opening connector in order to enable said die to move between said die shaker and said die slide through the opening connector, said die shaker has transparency, part of said die slide has light shielding properties, wherein said die slide has a slide lower surface and slide upper surface, wherein the slide lower surface and the slide upper surface are substantially parallel such that said die slides in said die slide without said die rolling, said means of turning turns said die container and comprises a motor and a plurality of gears connected to said motor, said die shaken in said die shaker that is stopped in a prescribed position in said die slide where the light is blocked by controlling the turn stop angle using said means of turning and a means of reading spots of said die stopped in said prescribed position is disposed on the side facing said die and said spots on said die are identified based on information obtained by such means for reading.

2. A gaming machine characterized by comprising a die container containing said die and a means of turning that turns said die container, the body of said die having transparency and the spot display panels formed on each face of said die body which have light shielding properties, said die container comprising a die shaker and a die slide where said die shaker is connected to said die slide by an opening connector in order to enable said die to move between said die shaker and said die slide through the opening connector, said die shaker has transparency, part of said die slide which has light shielding properties, wherein said die slide has a slide lower surface and slide upper surface, wherein the slide lower surface and the slide upper surface are substantially parallel such that said die slides in said die slide without said die rolling, said means of turning that turns said die container and comprises a motor and a plurality of gears connected to said motor, a means of reading comprising a light sensor that is disposed on the slide lower surface of said die slide, a means of illumination which is disposed on the slide upper surface of said die slide, said die shaken in said die shaker which is stopped in a prescribed position of said die slide having shielding properties by controlling the turn stop angle by said means of turning, said means of illumination which is disposed on the transparent part of said die slide stopped in a prescribed position, said means of illumination which is disposed on the No. 1 face equating to said spots on said die stopped in said prescribed position and said means of reading which is disposed on the No. 2 face opposite said No. 1 side, and said spots on said die identified based on information obtained by said means of reading.

3. A die rolling and identification apparatus characterized by comprising a die container containing a die and a motor and a plurality of gears connected to the motor to turn the die container, the die container comprising a die shaker and a die slide where said die shaker is connected to said die slide by an opening connector to enable said die to move between said die shaker and said die slide through the opening connector, wherein said die shaker has transparency and the bottom of the die slide has a light shield and wherein said die slide has a slide lower surface and slide upper surface, wherein the slide lower surface and the slide upper surface are substantially parallel such that said die slides in the die slide without said die rolling, wherein the die shaken in the die shaker that is stopped in a prescribed position in said die slide where the light is blocked by controlling the turn stop angle using the motor and plurality of gears and a light sensor is disposed on the side facing the die and reads the spots of the die stopped in the prescribed position.

\* \* \* \* \*